United States Patent Office 3,371,117
Patented Feb. 27, 1968

3,371,117
PROCESS FOR PREPARING BIS-QUATERNARY AMMONIUM SULFATES
Charles R. Campbell, Le Moyne W. Plischke, and Roland R. Spiegelhalter, Pensacola, Fla., assignors to Monsanto Company, St. Louis, Mo., a corporation of Delaware
No Drawing. Filed Feb. 15, 1965, Ser. No. 432,820
11 Claims. (Cl. 260—567.6)

ABSTRACT OF THE DISCLOSURE

A bis-tetraalkylammonium sulfate can be prepared by contacting one mole of a dialkyl sulfate with at least two moles of a trialkylamine at a temperature in the range of 50° to 400° C. and under pressure sufficient to prevent vaporization of the trialkylamine.

It is well-known that the reaction between a dialkyl sulfate ester and a trialkylamine will form a quaternary ammonium alkyl sulfate salt having the general formula $R_3R'NOSO_3R'$ wherein R and R' are either the same or different alkyl groups. However, to directly produce a bis-quaternary ammonium sulfate salt, $(R_3R'N)_2SO_4$, wherein R and R' are either the same or different alkyl groups, from a dialkyl sulfate ester and a trialkylamine is believed to be unknown.

Therefore, it is an object of this invention to provide a process for directly producing a bis-quaternary ammonium sulfate salt from a dialkyl sulfate ester and a trialkylamine.

Other objects will be apparent from the following description of the invention.

The above object is achieved in the provision of a process comprising intimately contacting in the reaction temperature range 0 to 400° C. for a reaction contact period sufficient to insure substantially complete reaction a dialkyl sulfate ester and a trialkylamine. Pressure is maintained at an intensity sufficient to prevent vaporization of said trialkylamine.

In a batch embodiment of the instant process, a selected dialkyl sulfate ester and trialkylamine are placed in a reaction vessel that can be heated under pressure. These reactants are then maintained in reacting contact at a substantially constant temperature for 0.25 to 3.0 hours; although, 0.5-1.0 hour of reaction contact is usually sufficient. Pressure in the reaction vessel is maintained at a level sufficient to prevent vaporization of the amine at the particular reaction temperature. Reaction temperatures from 50 to 400° C., depending upon the product to be produced, have been found to be quite adequate. A preferred temperature range is 100-200° C. As the molecular weight of the desired bis-quaternary ammonium sulfate salt increases, both reaction temperature and reaction contact time must be increased. For example, the reaction between dimethyl sulfate and trimethylamine can be carried out at a lower reaction temperature and reaction contact time than the reaction between dipropyl sulfate and tripropylamine.

At elevated temperatures sulfate ester hydrolysis takes place. Such hydrolysis tends to reduce the product yield and to contaminate the final product. It has been found that sulfate ester hydrolysis can be minimized by forming one quaternary group (—O—NR$_3$R') at a relatively low temperature (0–50° C.). After the first quaternary group has been formed, the reaction temperature is then elevated to effect formation of the second quaternary group. This elevated temperature is usually between 50 and 400° C.

Total reaction contact time in this embodiment is the same (0.25 to 3.0 hours) as in the first described embodiment. The reaction contact time devoted to the low temperature portion of the reaction is usually either smaller than or about equal to the high temperature portion.

The proportion of reactants is not critical. However, to increase reaction rates and to improve yield a stoichiometric excess of trialkylamine is generally provided in all embodiments of the inventive process herein described. Optimum results are obtained when the stoichiometric excess of trialkylamine is greater than 10 percent.

The reaction generally takes place in a solvent, preferably water. However, any inert solvent in which the reactants and product will dissolve is quite adequate.

In the embodiments discussed both above and hereinafter, once the reaction has proceeded to substantial completion excess amine is separated from the reaction mass and recovered, usually for reuse as a reactant. In all embodiments discussed herein, once excess amine is removed from the reaction product this product is then usually evaporated to dryness or at least concentrated by evaporation.

In a continuous embodiment of the process a dialkyl sulfate ester and a trialkylamine are fed to a reaction zone maintained at a temperature between 50 and 400° C. Pressure in the zone is sufficient to prevent vaporization of the trialkylamine. Reactants are fed to the reaction zone in separate streams. The size of the reaction zone and feed rates are adjusted to provide the desired contact time, usually between 0.25 and 3.0 hours.

In another, preferred, continuous embodiment dialkyl sulfate ester and trialkylamine are continuously fed into a first reaction zone. The reactants are fed as separate streams. Temperature in this first zone is maintained between 0 and 50° C. Pressure is maintained high enough to prevent vaporization of the trialkylamine. A tetraalkylammonium alkyl sulfate is herein produced. Sufficient contact time is provided to insure substantial completion of the reaction. The reaction product and unreacted amine are then continuously fed into a second reaction zone wherein a temperature between 50 and 400° C. is maintained. Pressure in this second zone is maintained at a level sufficient to prevent vaporization of the trialkylamine at the particular reaction temperature. Total reaction contact time in both zones is between 0.25 and 3.0 hours.

Many bis-quaternary ammonium sulfate salts can be produced by the method of the invention. However, because of the commercial importance of bis-quaternary ammonium sulfate salts having as each of their alkyl groups a saturated aliphatic radical containing from 1 to 8 carbon atoms, the instant process is particularly important for producing such salts. Those salts having as each of their alkyl groups a saturated aliphatic radical containing from 1 to 4 carbon atoms are especially suitable for being produced by the instant process.

A few of the bis-quaternary ammonium sulfate salts producible by the instant process are bis-tetramethylammonium sulfate, bis-triethylmethylammonium sulfate, bis-tetraethylammonium sulfate, bis-trimethylethylammonium sulfate, and bis-tetrapropylammonium sulfate.

Herein below are a number of examples that illustrate the present invention. They are intended to be illustrative only and are not meant to limit the invention in any manner whatsoever.

Example 1

This example illustrates batch preparation of tetramethylammonium sulfate. One mole (126.2 grams) of dimethylsulfate was added to 4.00 moles (236.4 grams) of trimethylamine dissolved in 551.6 grams of water. Solution temperature was maintained at about 5° C. by a cooling bath. The solution, after substantially complete reaction, was transferred to a shaker bomb and heated to about 180° C. under autogenous pressure (685 p.s.i.g.). After cooling to ambient temperature, the reaction solution was removed from the shaker bomb. Excess trimethylamine was removed by heating the reaction solution to about 125° C. at atmospheric pressure. Results and conditions of this experiment are summarized in the table below.

TABLE I

Feed:
Trimethylamine, grams _____ 236.4
Trimethylamine solution concentration,
  volume percent _____ 30
Dimethyl sulfate, grams _____ 126.2
Moles amine/mole dimethyl sulfate _____ 4.0
Operating Conditions:
  First Stage
    Pressure _____ Atmospheric
    Temperature, ° C. _____ 5
  Second Stage
    Pressure, p.s.i.g. _____ 685
    Temperature, ° C. _____ 180
    Contact time, hours _____ 1.5
Products:
  Bis-tetramethylammonium sulfate, grams ___ 236.0
  Trimethylammonium tetramethylammonium
    sulfate, grams _____ 4.3
  Tetramethylammonium methyl sulfate,
    grams _____ 1.7
  Bis-tetramethylammonium sulfate yield,
    based on dimethylsulfate weight _____ 96.5

*Example II*

One and ninety-nine hundredths (1.99) moles (251 grams) of dimethyl sulfate were slowly added to a 25 volume percent aqueous solution of trimethylamine. Throughout the addition of dimethyl sulfate the solution was constantly stirred and the temperature was maintained at 28–30° C. The mole ratio of amine to ester was about 2.5 to 1. Ester addition took place in a one-hour period. Reaction product was then fed continuously to a steam-jacketed reactor held at about 125° C. and 175 p.s.i.g. Contact time was one hour.

Reaction product from this reactor was collected and stripped of excess trimethylamine under atmospheric pressure. The table below summarizes this experiment.

TABLE II

|  | First Stage | Second Stage |
| --- | --- | --- |
| Feed: |  |  |
| Dimethyl sulfate, grams | 251 |  |
| Moles amine/mole dimethyl sulfate | 2.58 |  |
| Operating Conditions: |  |  |
| Temperature, °C | 30 | 125 |
| Contact time, hours | 1.0 | 1.0 |
| Pressure, p.s.i.g | Atmospheric | 175 |
| Products: |  |  |
| Bis-tetramethylammonium sulfate, grams | 93.4 | 470.9 |
| Trimethylammonium tetramethylammonium sulfate, grams | 0.8 | 0.2 |
| Tetramethylammonium methyl sulfate, grams | 286.6 | 11.8 |
| Bis-tetramethylammonium sulfate yield, based on dimethyl sulfate weight | 19.2 | 96.9 |

*Example III*

Dimethyl sulfate and 25.1 volume percent aqueous trimethylamine were continuously fed to a steam jacketed reactor held at about 125° C. and 175 p.s.i.g. The feed rates were adjusted to maintain selected contact times and a mole ratio of 2.5 moles of amine per mole of ester. This experiment was performed twice, at contact times of 0.5 and 1.0 hour. Excess amine was removed from each reaction product. The table below summarizes the conditions and results of both runs.

TABLE III

|  | Contact time | |
| --- | --- | --- |
|  | 0.5 hour | 1.0 hour |
| Feed: |  |  |
| Dimethyl sulfate, grams | 418.3 | 500.7 |
| Moles amine/mole dimethyl sulfate | 2.56 | 2.47 |
| Operating Conditions: |  |  |
| Pressure, p.s.i.g | 175 | 175 |
| Reaction temperature, °C | 124 | 126 |
| Product: |  |  |
| Bis-tetramethylammonium sulfate, grams | 750.2 | 1,036.4 |
| Trimethylammonium tetramethylammonium sulfate, grams | 7.3 | 19.2 |
| Tetramethylammonium methyl sulfate, grams | 39.9 | 21.7 |
| Bis-tetramethylammonium sulfate yield, based on dimethyl sulfate weight | 92.7 | 95.5 |

*Example IV*

Two moles (252 grams) of dimethyl sulfate were slowly added to a mixture of 2000 ml. of water and 505 grams of triethylamine cooled to about 10° C. Reaction temperature was not allowed to exceed 15° C. Sulfate addition required one hour. The reaction product warmed to ambient temperature. This product was then continuously fed to a high pressure reactor.

Table IV summarizes the conditions and results of this experiment.

TABLE IV

|  | First Stage | Second Stage |
| --- | --- | --- |
| Feed: |  |  |
| Triethylamine, grams | 505 |  |
| Dimethyl sulfate, grams | 252 |  |
| Moles amine/mole dimethyl sulfate | 2.5 |  |
| Operating Conditions: |  |  |
| Temperature, °C | 10–15 | 126 |
| Contact time, hours | 1.0 | 1.0 |
| Pressure, p.s.i.g | Atmospheric | 250 |
| Products: |  |  |
| Bis-triethylmethylammonium sulfate, grams | 37.8 | 425.4 |
| Triethylmethylammonium methyl sulfate, grams | 444.2 | 184.0 |

This invention provides a new and quite efficient method for preparing bis-quaternary ammonium sulfate salts from readily obtainable, inexpensive raw materials.

The invention has been described by referring to specific embodiments. Nevertheless, the invention should be broadly construed and should only be limited by the scope of the appended claims.

What is claimed is:

1. A process for preparing a bis-tetraalkylammonium sulfate which comprises contacting one mole of a dialkyl sulfate in which each alkyl group contains 1 to 8 carbon atoms with at least two moles of a trialkylamine in which each alkyl group contains 1 to 8 carbon atoms at a temperature in the range of 50° to 400° C. and under pressure sufficient to prevent vaporization of the trialkylamine.

2. A process as defined in claim 1, in which the dialkyl sulfate and the trialkylamine are contacted at 50° to 400° C. until the resulting reaction is substantially complete.

3. A process as defined in claim 1, in which the dialkyl sulfate and the trialkylamine are contacted at 50° to 400° C. for between 0.25 and 3 hours.

4. A process as in claim 1, in which the dialkyl sulfate is contacted with a stoichiometric excess of the trialkylamine.

5. A process as defined in claim 1, in which each alkyl group of the dialkyl sulfate and each alkyl group of the trialkylamine contains 1 to 4 carbon atoms.

6. A process as in claim 1, in which the temperature is in the range of 100° to 200° C.

7. A process for preparing a bis-tetraalkylammonium sulfate which comprises contacting one mole of a dialkyl sulfate in which each alkyl group contains 1 to 8 carbon atoms with at least two moles of a trialkylamine in which each alkyl group contains 1 to 8 carbon atoms at a temperature in the range of 0 to 50° C. and under pressure sufficient to prevent vaporization of the trialkylamine, and thereafter heating the resulting mixture at a temperature in the range of 50° to 400° C. under pressure sufficient to prevent vaporization of the trialkylamine.

8. A process as defined in claim 7, in which said mixture is heated at 50° to 400° C. until the resulting reaction is substantially complete.

9. A process as defined in claim 7, in which the total time of said contacting at 0° to 50° C. and said heating at 50° to 500° C. is between 0.25 and 3 hours and the time of said contacting at 0° to 50° C. is shorter than or equal to the time of said heating at 50° to 500° C.

10. A process as defined in claim 7, in which the dialkyl sulfate is contacted with a stoichiometric excess of the trialkylamine.

11. A process as defined in claim 7, in which each alkyl group of the dialkyl sulfate and each alkyl group of the trialkylamine contains 1 to 4 carbon atoms and the resulting mixture is heated at a tempertaure in the range of 100° to 200° C.

References Cited

UNITED STATES PATENTS 2,569,326  9/1951  Niederl et al. _____ 260—567 X

CHARLES B. PARKER, *Primary Examiner.*

R. V. HINES, *Assistant Examiner.*